United States Patent [19]
Winter et al.

[11] 4,367,590
[45] Jan. 11, 1983

[54] CALIBRATED TAPE FOR USE IN CONSTRUCTING WALL WITH VERTICAL STUDS

[76] Inventors: Craig R. Winter, 296 Manfre Rd., Watsonville, Calif. 95076; Stanley M. Bird, Sr.; Keneth E. Presba, both of Star Route, Georgetown, Calif. 95634

[21] Appl. No.: 248,398

[22] Filed: Mar. 27, 1981

[51] Int. Cl.³ .............................................. G11B 3/10
[52] U.S. Cl. ............................ 33/137 R; 33/174 G; 33/189
[58] Field of Search ................... 33/137 R, 174 G, 189

[56] References Cited
U.S. PATENT DOCUMENTS 2,187,087  1/1940  Leary ................................ 33/137 R
4,149,320  4/1979  Troyer et al. .................... 33/137 R

*Primary Examiner*—Steven L. Stephan
*Attorney, Agent, or Firm*—Townsend and Townsend

[57] ABSTRACT

A calibrated tape capable of being separated into halves along a central portion thereof. The tape has indicia thereon which represent units of distance, each half of the tape having the same indicia as the other half. The tape is adapted to be secured to a pair of adjacent plates which are used to form the upper and lower plates of a wall of the type having spaced, vertical studs secured to the plates. The plates are first tacked together in side-by-side relationship and the tape is applied to both plates. Then the plates are separated, causing the separation of the halves of the tape, the halves remaining on respective plates to form guides for locating the positions at which the ends of the studs are to be attached to the plates. Several embodiments of the tape are described. A second tape is used over the first tape to represent the locations for window and door openings in the wall.

12 Claims, 7 Drawing Figures

CALIBRATED TAPE FOR USE IN CONSTRUCTING WALL WITH VERTICAL STUDS

This invention relates to improvements in the construction of walls of the type having vertical studs secured to upper and lower plates and, more particularly, to an improved guide for accurately locating the positions at which the ends of the studs are to be connected to the plates.

BACKGROUND OF THE INVENTION

When a wall of the type having upper and lower plates and vertical studs is to be erected, the upper and lower plates of the wall are first tacked together. Then a workman using a conventional tape measure extending along the plates marks lines on both upper and lower plates. These lines represent the center lines of studs which are to be connected to the plates. The workman makes a series of these lines at locations 16 inches apart, the standard spacing between the center lines of adjacent studs. While this technique has been used for a number of years and is satisfactory, its use is time-consuming and somewhat tedious in view of the relatively long lengths of the plates. For these and other reasons, a need has arisen for improvements in locating the points along the upper and lower plates at which the studs are to be secured.

SUMMARY OF THE INVENTION

The present invention satisfies the aforesaid need by providing a calibrated tape which can be adhesively or otherwise applied to the upper and lower plates when the same are tacked together yet the tape can be separated into halves which remain on the plates when the plates are separated and erected in the usual manner to form the upper and lower plates of a wall. Thus, the calibrated tape halves provide accuratley aligned indicia which represents the locations at which the upper and lower ends of a number vertical studs are to be secured to the plates. Because of such accuracy, the studs will be truly vertical and the need for manual marking of the stud location is clearly eliminated by the use of the tape.

A second tape can be used in association with the first mentioned tape to define the locations of king studs which are used to form window and door openings in the wall. The second tape has certain indicia thereon and is placed over and adhesively applied to the first tape when the upper and lower plates are tacked together. The second tape is preferably translucent or transparent to permit the workmen to view the first tape through the sencond tape. However, the width of the second tape can be less than that of the first tape so that at least portions of the halves of the first tape can be seen even though halves of the second tape overlie the halves of the first tape. When the plates are separated from each other, both the first tape and the second tape separate into halves which remain on respective plates to form guides as described above.

Each of the above tapes can have a score line or a line of weakness along a central portion thereof to present the line along which the tape halves are separated. The score line can be made-up of a series of small openings or elongated slits. In the alternative, the material of the tape can be paper-based or other suitable material, such as a thin plastic which be sheared by a cutting blade. Furthermore, the tape can initially be in the form of a roll in a housing provided with a blade near an outlet opening for the tape so that, as the tape is applied to the upper and lower plates, the tape is severed and applied by an adhesive to the plates.

The primary object of the present invention is to provide a calibrated tape which can be separated into halves and which can be applied to upper and lower plates of a wall to be erected when the plates are tacked together so that, upon separation of the plates, the tape halves remain on respective plates and form guide locations for accurately showing the locations at which the upper and lower ends of vertical studs are to be secured to the plates.

Another object of the present invention is to provide a method of erecting a wall of the type having upper and lower plates and vertical studs extending between the plates wherein the locations for attaching the ends of the studs to the plates is determined by the use of an improved calibrated tape without the need for a conventional tape measure and a marking instrument as has been required in the past for erecting a wall of this type.

Other objects of the present invention will become apparent as the following specification progresses, reference being had to the accompanying drawings for an illustration of several embodiments of the invention.

Figure 1:
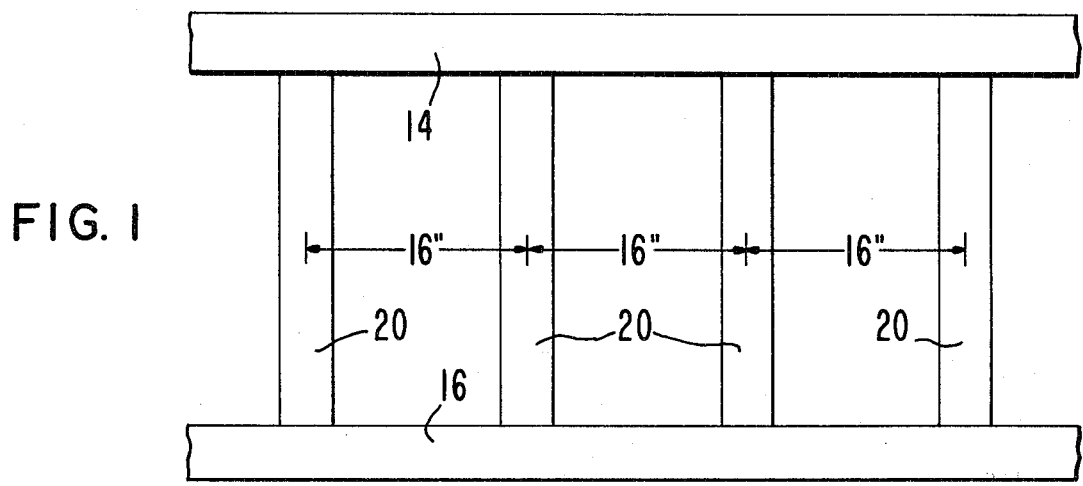
FIG. 1 is a side elevational view of a wall of the type with which the tape measure of the present invention is used, the wall including upper and lower plates and spaced, vertical studs interconnecting the plates.
Figure 2:
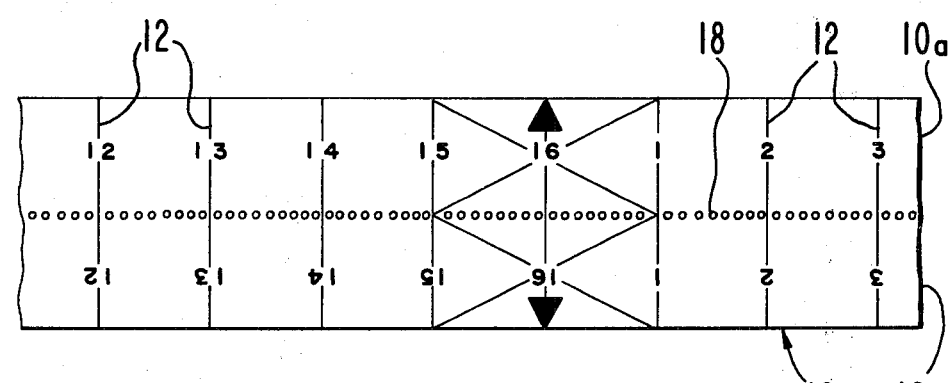
FIG. 2 is an enlarged, fragmentary side elevational view of the calibrated tape of the present invention.
Figure 6:
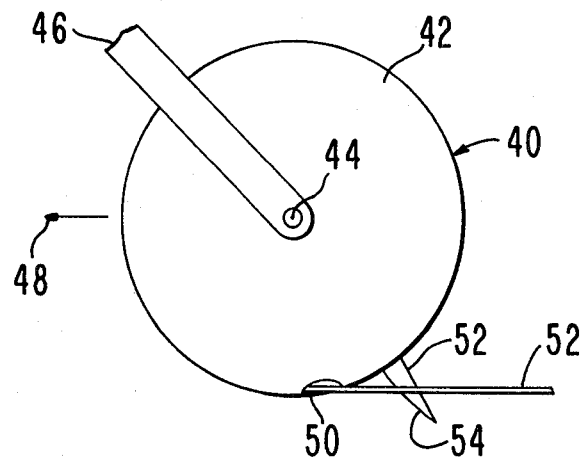
Figure 7:
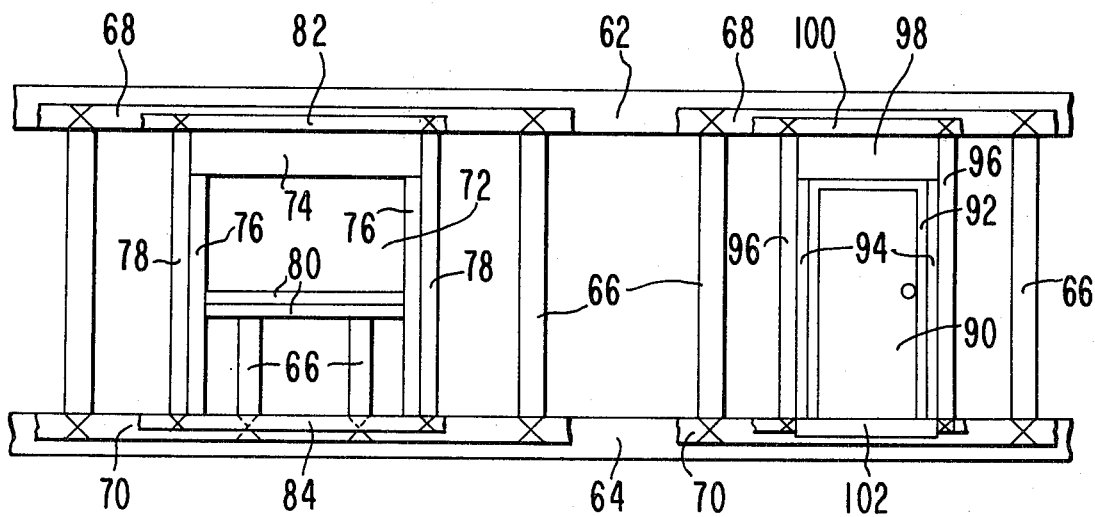

FIG. 6 is a side elevational view of a dispenser for the calibrated tape of the present invention, the dispenser having a cutter thereon for slitting the tape along the center line thereof; and FIG. 7 is a view similar to FIG. 1 but showing the way in which a second tape can be used with the tape of FIG. 2 to mount a window and a door in the wall. A first embodiment of the calibrated tape of the present invention is broadly denoted by the numeral 10 and includes a plurality of transverse lines 12 drawn or otherwise applied to one face thereof to present calibrated indicia along with numerals associated with each line, respectively. The lines, for the purposes of the present invention are 1" apart and the lines associated with the numerals 1, 15, and 16 have a pair of X's on the opposite sides of a center line 18 which is a line of weakness of a line along which a cutter can move for splitting the tape into halves 10a and 10b. Tape 10, in a first embodiment, has a plurality of holes 19 therethrough along line 18, the holes defining a score line which permits easy separation of the tape at the halves 10a and 10b.

Tape 10 can be formed from any suitable material but preferably it is formed from a paper-based material. It has a layer of a suitable adhesive on the back face thereof, namely the face opposed to the face having lines 12 thereon. The adhesive layer is covered by removably, protective cover sheet (not shown) which is stripped away when tape is to be used.

Tape 10 is adapted to be used with upper and lower plates 14 and 16 of the type which are used to form a wall 21 (FIG. 1) having spaced, vertical studs 20 secured to plates 14 and 16 and spanning the distance therebetween. For standard building codes, the center line-to-center line distance between studs 20 is 16 inches. It is the purpose of tape 10 to be mounted on plates 14 and 16 and to indicate a plurality of locations along both plates which are 16 inches apart.

Figure 3:
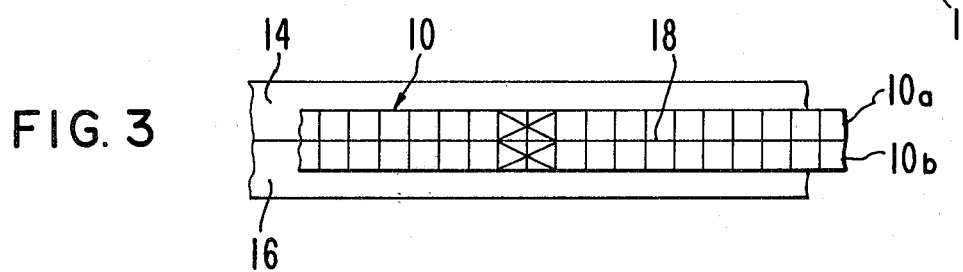
FIG. 3 is a fragmentary, side elevational view of the upper and lower plates of FIG. 1 with the calibrated tape of the present invention attached thereto before the plates are separated and erected to form the wall of FIG. 1.

In use, tape 10 is adhesively secured to the sides of plates 14 and 16 when the plates are tacked or nailed together in the manner shown in FIG. 3. When so mounted, tape 10 has its center line 18 aligned with the junction between plates 14 and 16 as shown in FIG. 3.

Figure 4:
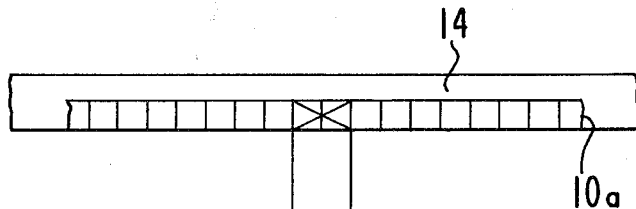
FIG. 4 is a view similar to FIG. 1 but showing the tape halves on the upper and lower plates when the plates are in an operative position and when a stud spans the distance between the plates.
Figure 4:
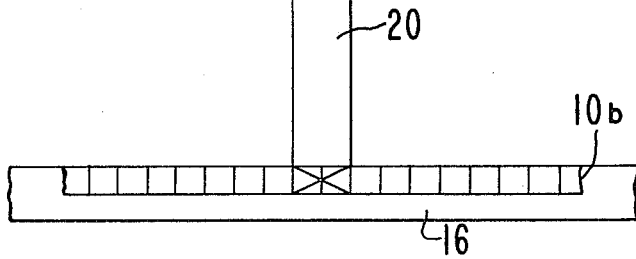

After the tape has been applied to the plates 14 and 16, the plates are separated manually and, when they are separated, tape 10 is separated into halves 10a and 10b because of the presence of the line of weakness 18 in the tape. The adhesive force of the adhesive when applied to plates 14 and 16 is greater than the force necessary to separate tape 10 into halves 10a and 10b; thus, the halves move apart from each other yet remain on respective plates. When the plates are mounted in the manner shown in FIG. 4 in their operative positions, it is a simple matter to vertically align a stud 20 with an aligned pair of vertically spaced X's on tape halves 10a and 10b and then to secure the ends of the stud to the upper and lower plates 14 and 16.

Figure 5:
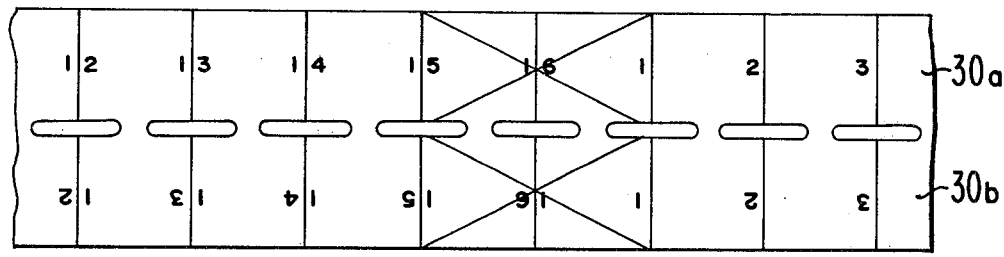
FIG. 5 is a view similar to FIG. 2 but showing another embodiment of the calibrated tape of the present invention.

FIG. 5 shows a second embodiment of the calibrated tape of this invention, the tape being denoted by the numeral 30. The tape is substantially the same as tape 10 of FIG. 2 except that the center line 18, instead of having a plurality of holes 19 therein, has a series of end-to-end slits 23 therein forming a line of weakness to permit easy separation of tape 30 into halves 30a 30b . Tape 30 will have and adhesive layer on its backside and the adhesive layer will be covered by a removably, protective sheet until tape 30 is ready for use. Tape 30 is used in the same manner as that described above with respect to wall 21.

FIG. 6 shows a dispenser 40 suitable for dispensing tape 10 or tape 30 in such a manner that the tape is slit along its center line as it is applied to plates 14 and 16. To this end, dispenser 40 includes a housing 42 which receives tape 10 in the form of a roll wound around a center shaft 44 which projects outwardly from opposed faces of the housing. Shaft 44 will permit a handle 46 to be mounted on the shaft for pulling the housing in the direction of arrow 48 (see FIG. 6). The housing has an outlet opening 50 through which tape 52 extends. A cutter 52 having a cutting edge 54 is secured to and projects downwardly from the housing rearwardly of the opening 50 with reference to the forward direction 48 of movement of housing 42. The cutting blade 54 projects sufficiently below the horizontal plane of opening 50 so that tape 52 is slit as it is dispensed from the housing. Blade 52 is sufficiently thin so that is can pass at least slightly between plates 14 and 16 as tape 52 is applied to the plates in the manner shown in FIG. 3. Tape 52 has an adhesive layer on its backside and has lines and numerals such as lines 12 in the numeral shown in FIG. 2 on its front side.

The teachings of the present invention are also suitable for forming window and door openings in a wall formed by upper and lower plates 62 and 64 and a plurality of studs 66 secured to the plates. The locations of the studs are determined as described above by the use of a tape of the type shown in FIGS. 2 and 5, FIG. 7 showing tape segments 68 on upper plate 62 and tape segments 70 on lower tape plate 64. Segments 68 and 70 are the halves of a single tape such as tape 10, tape 30 or tape 52, and the segments are separated from each other when plates 62 and 64, initially tacked together in the manner shown in FIG. 3, are separated after the single tape is adhesively bounded to the adjacent sides of the plates.

In the formation of a window opening 72, a header 74 is placed on the upper ends of a pair of spaced cripples 76 adjacent to respective king studs 78. Short studs 66 are secured below a pair of sill numbers 80 at 16 inch spacings so that the header 74, the cripples 76 and the upper sill member define window opening 72.

The locations of king studs 78 can quickly and easily be established by providing second tape segments 82 and 84 overlying adjacent first tape segments 68 and 70. Segments 82 and 84 initially form a single tape separable along its center line by a line of weakness or by a cutting action, the separation taking place either when the upper and lower plates 62 and 64 are separated such as described with the separation of plates 14 and 16 (FIG. 3) or when the tape is cut as it is being applied with a dispenser of the type shown in FIG. 6. Segments 82 and 84 will have appropriate X's to represents the locations at which the upper and lower ends of king studs 78 are to be secured to upper and lower plates 62 and 64.

To allow for the erection of king studs 78 as well as the shorter studs 66 below sill members 80, tape segments 82 and 84 are translucent or transparent so that the X's of segments 68 and 70 can be seen through segments 82 and 84. In the alternative, segments 82 and 84 can have widths less than the width of adjacent segments 68 and 70 so that part of the X's on segments 68 and 70 can be seen.

A procedure similar to the one followed in forming window opening 72 is used to form an opening for a door 90 having a frame 92. The door frame is to be mounted adjacent to a pair of cripples 94 which, in turn, are adjacent to a pair of king studs 96 on opposite ends of a header 98. Tape segments 100 and 102 are used to locate the upper and lower connection points on plates 62 and 64 for king studs 96. Thus, tape segents 100 and 102 serve the same purpose of tape segments 82 and 84 described above with respect to the formation of window opening 72.

The present invention provides a first tape which is simple and rugged in construction and is especially suitable for mounting of vertical studs on upper and lower plates. A second tape similar in construction to the first tape can be used for mounting king studs associated with window and door opening in a wall. Thus, the present invention simplifies the construction of the wall when the wall has windows and doors to thereby minimize construction costs without requiring additional skills on the part of workment who are to erect the wall.

What is claimed is:

1. A device for use in determining the attachment locations of a plurality of spaced studs on a pair of spaced, parallel plates of a wall comprising: a tape of one-piece construction and having a pair of opposed faces, one of the faces having a plurality of indicia thereon at spaced locations along the length of the body, the opposite face of the tape having means around for attaching the tape to said plates when the plates are tacked together, the tape being separable into halves along a longitudinally extending line, the indicia on one tape half being identical to and transversely aligned with the indicia on the other tape half whereby, when the plates are tacked together and the tape halves are attached to respective plates, the tape halves will separage from each other and remain secured to respective plates when the plates are untacked and moved away from each other.

2. A device as set forth in claim 1, wherein the tape has a a plurality of perforations therethrough along said line to define a line of weakness for the tape.

3. A device as set forth in claim 1, wherein the tape has a plurality of end-to-end slits therein along said line, the slits defining a line of weakness for the tape.

4. A device as set forth in claim 1, wherein such attaching means includes a layer of adhesive on the opposite face of the tape.

5. A device as set forth in claim 1, wherein the tape is formed from a paper-based material.

6. A tape as set forth in claim 1, wherein the tape is transparent.

7. A method of forming a wall of the type having an upper plate, a lower plate, and a plurality of spaced studs secured at the ends thereof to the upper and lower plates comprising: tacking the plates together so that they are side-by-side with respect to each other; applying a calibrated tape to the tacked plates so that a first longitudinal part of the tape is applied to one plate and a second longitudinal part of the tape is applied to the other plate with the parts having identical indicia thereon and with the indicia on one part being aligned with and adjacent to a corresponding indicia on the other part, separating the plates and simultaneously separating the tape into the parts with the parts remaining on respective plates; and securing a number of vertical studs to the plates with the studs being located by aligned, corresponding indicia on the tape parts.

8. A method as set forth in claim 7, wherein the tape has a line of weakness dividing it into two halves which define said parts, the separating step including pulling the tape halves apart along the line of weakness as the plates are separated from each other.

9. A method as set forth in claim 7, wherein is included the step of slitting the tape into a pair of halves as the tape is applied to the upper and lower plates, said halves defining said parts.

10. A method as set forth in claim 7, wherein said applying step includes adhesively bonding the tape to the plates.

11. A method as set forth in claim 9, wherein is included the step of applying a second tape to the first-mentioned tape with the second tape having indicia for locating a pair of studs for forming a window or door opening in the wall, and including the step of separating the second tape into a pair of parts when the plates are separated from each other.

12. A device for use in determining the attachment locations of a plurality of spaced studs on a pair of spaced, parallel plates of a wall comprising: a tape having a pair of opposed faces, one of the faces having a plurality of indicia thereon at spaced locations along the length of the body, the opposite face of the tape having means around for attaching the tape to said plates when the plates are tacked together, and a hollow housing having an opening therethrough, the tape being in a form of a roll in the housing and extending outwardly therefrom through the opening, the housing having a cutter blade for severing the tape into a pair of halves as the tape is pulled out of the housing the indicia on one tape half being identical to and transversely aligned with the indicia on the other tape half whereby, when the plates are tacked together and the tape halves are attached to respective plates, the tape halves will remain secured to the plates when the plates are untacked and separated from each other.

* * * * *